Figure 1:
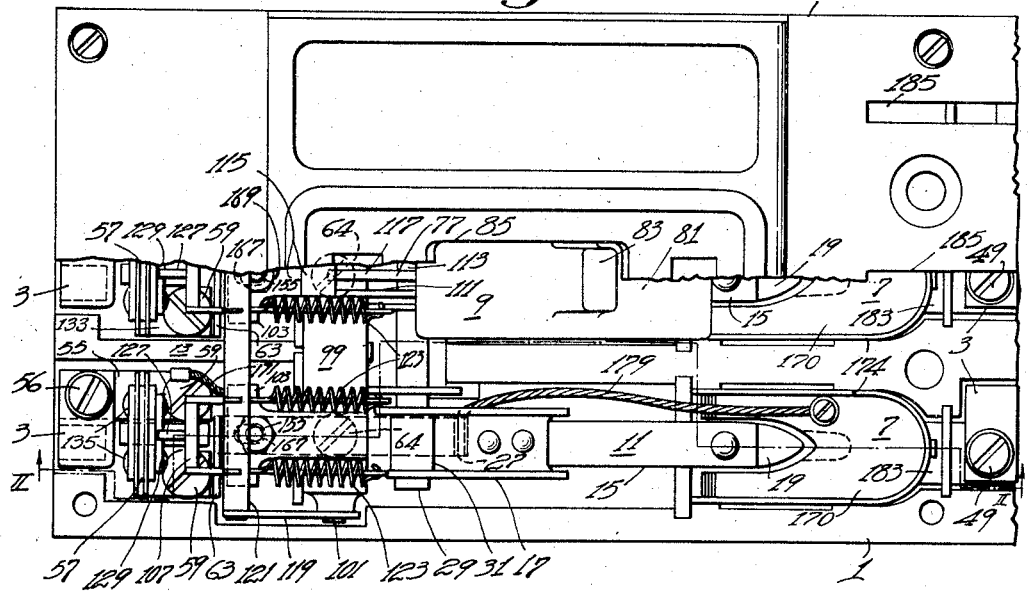

Dec. 13, 1938.　　　　O. S. JENNINGS　　　　2,140,360
CIRCUIT INTERRUPTER
Filed Oct. 31, 1933　　　3 Sheets-Sheet 1

WITNESSES:　　　　　　　　　　　　　　　INVENTOR
　　　　　　　　　　　　　　　　　　　　Oliver S. Jennings.
　　　　　　　　　　　　　　　　　　　　BY
　　　　　　　　　　　　　　　　　　　　　F. W. Lyle
　　　　　　　　　　　　　　　　　　　　　ATTORNEY Dec. 13, 1938.     O. S. JENNINGS     2,140,360
CIRCUIT INTERRUPTER
Filed Oct. 31, 1933     3 Sheets-Sheet 2
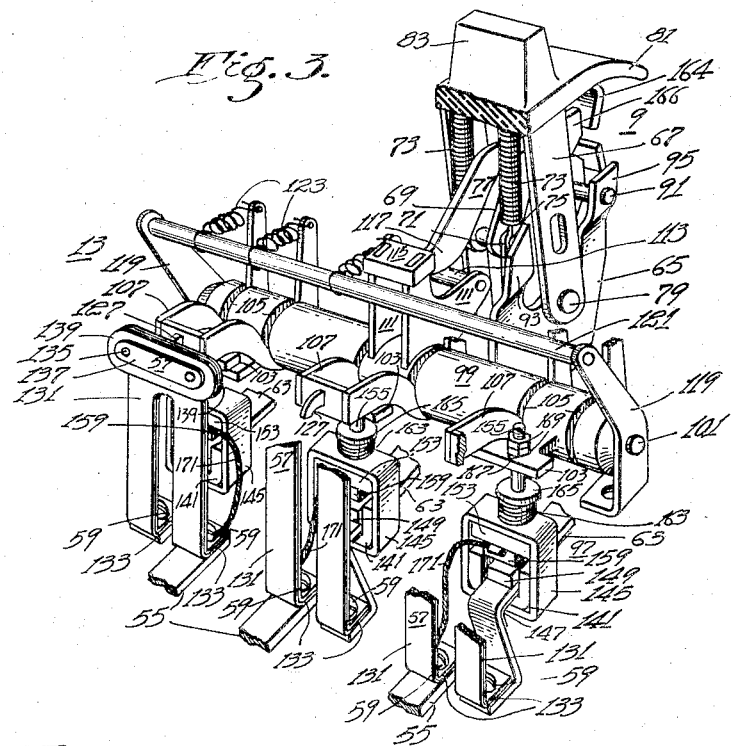
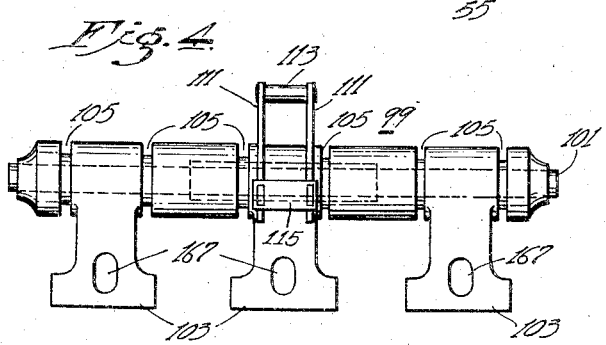
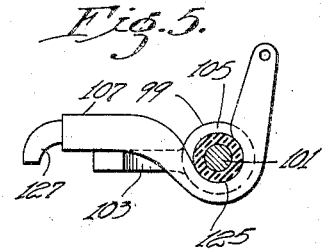
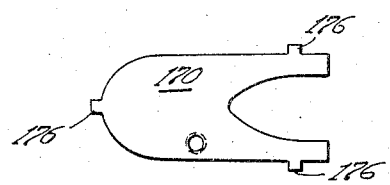
WITNESSES:
INVENTOR
Oliver S. Jennings.
BY
F. W. Lyle,
ATTORNEY

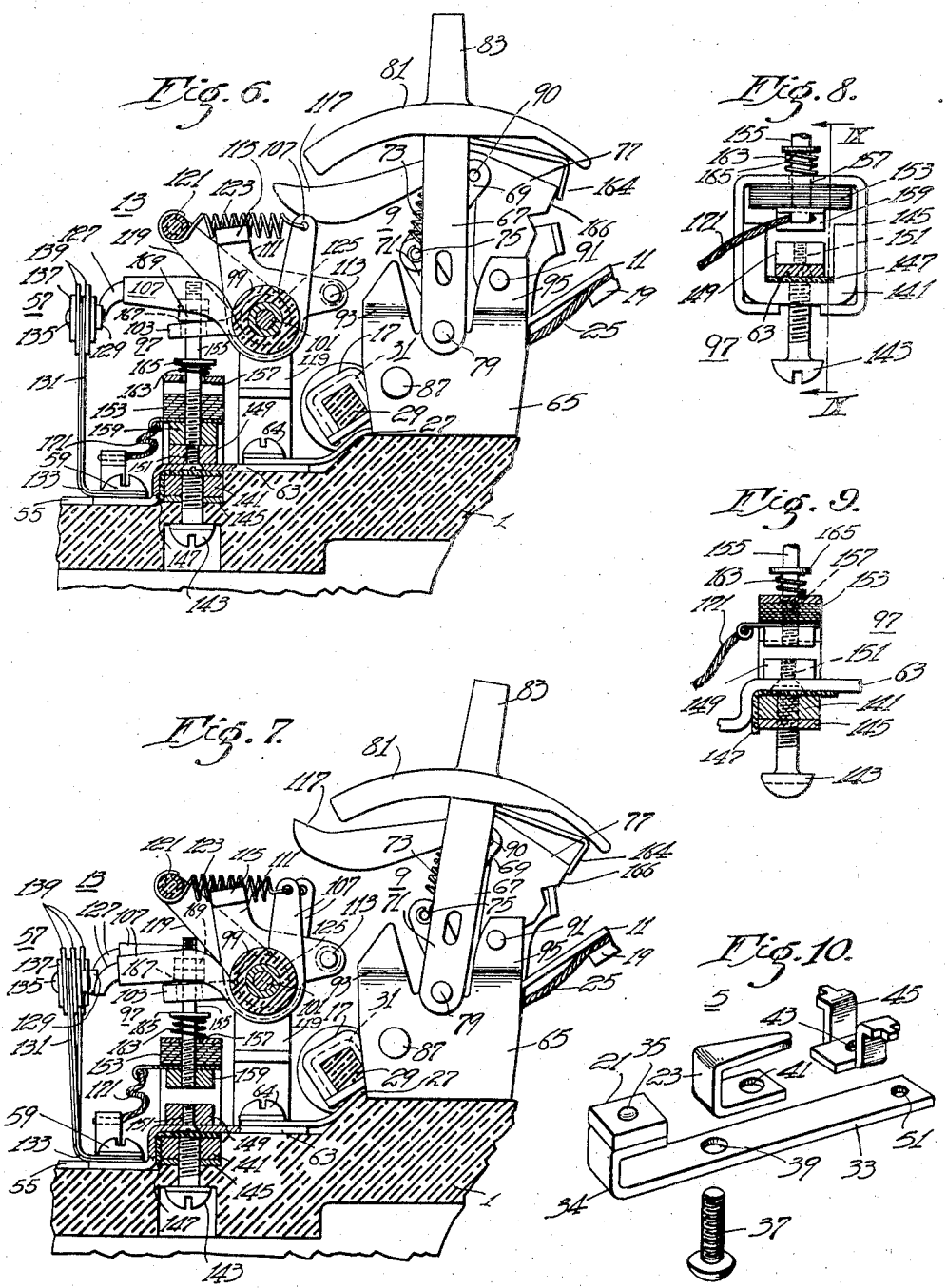

Patented Dec. 13, 1938

2,140,360

UNITED STATES PATENT OFFICE 2,140,360

CIRCUIT INTERRUPTER

Oliver S. Jennings, Mansfield, Ohio, assignor to Westinghouse Electric & Manufacturing Company, East Pittsburgh, Pa., a corporation of Pennsylvania Application October 31, 1933, Serial No. 696,059

35 Claims. (Cl. 200—88)

My invention relates to circuit interrupters and particularly to circuit breakers for use in controlling lighting and distribution of feeder circuits.

This type of service subjects circuit breakers to very severe and very exacting operating requirements. The normal line current is usually of low magnitude, the short circuit or overload current which the breaker may be required to interrupt often reaches a very large value due to the power fed in from other parts of the connected network. Short circuits or severe overloads must be interrupted substantially instantaneously in order to prevent serious damage to the wiring and to the protected apparatus, and yet, to avoid unnecessary interruptions of service, moderate or transient overloads must not be interrupted unless they have persisted for a sufficient period of time to endanger the system. In addition, the cost of the breaker must not be excessive.

These requirements all tend to severely complicate the problem of circuit breaker designs, and it is an object of my invention to provide an improved circuit breaker that shall be economical to manufacture, that shall be capable of quickly and efficiently interrupting large amounts of power, that shall operate practically instantaneously upon the occurrence of short circuit or severe overload conditions in the controlled circuit, that shall accurately distinguish between severe and moderate overloads to prevent unnecessary interruptions in the power supply, and that shall be provided with means for protecting the various parts of the circuit breaker from damage or injury during the occurrence of abnormal circuit conditions.

It is also an object of my invention to provide an improved trip device for use with electrical apparatus, my improved trip device to include a current-carrying thermally responsive element and a magnetically responsive element, the magnetically responsive element being movable, upon the occurrence of predetermined conditions, both to actuate the trip mechanism and to limit the current in the thermally responsive device.

Another object of my invention is to provide an improved trip mechanism for use with multi-pole circuit breakers, my improved mechanism to include a trip member actuable by any one of a plurality of movable trip elements, each of which is controlled by a thermally responsive element, a plurality of magnetically responsive elements, each movable to actuate the trip member and to limit the current in one of the thermally responsive elements, and means whereby the trip elements can be reset through movement of the breaker operating handle.

Another object of my invention is to provide an improved trip mechanism embodying a main latch for releasably restraining the trigger of the circuit breaker operating mechanism, in which the main latch is moved to release the trigger by a spring biased trip member restrained in inoperative position by a light load latch controlled by the current responsive member.

Another object of my invention is to provide an improved contact structure for use with circuit interrupters, the current path through the contact structure being so arranged that the magnetic reaction acting upon the arc established incident to the interruption of the connected electrical circuit causes the arc to move toward one end of the contact member.

A further object of my invention is to provide an improved arc extinguishing device of the spaced-plate type. My improved arc extinguishing device to include a plurality of spaced plates of magnetic material having tapered slots therein, the degree of taper of the slots being variable so as to secure more rapid and more effective extinguishing of the arc.

Since the principal field for immediate application of my invention is in connection with circuit breakers for low and moderate power circuits, I shall hereinafter describe an embodiment of my invention as applied to such devices, without however, in any way intending to restrict the scope of my invention, except as indicated in the appended claims.

In this embodiment, I provide a plurality of stationary contacts and a plurality of switch members for cooperating therewith to open and to close a plurality of poles, a manually operable actuating mechanism for moving the switch members to the open and to the closed positions with a snap action, and a trip device for cooperating with the actuating mechanism so as to cause all of the switch arms to be moved to the open circuit position upon the occurrence of predetermined conditions in the circuit controlled by any one of the poles of the breaker. The method of operation and the structural elements utilized in accomplishing the objects of my invention will be described in detail later.

Figure 2:
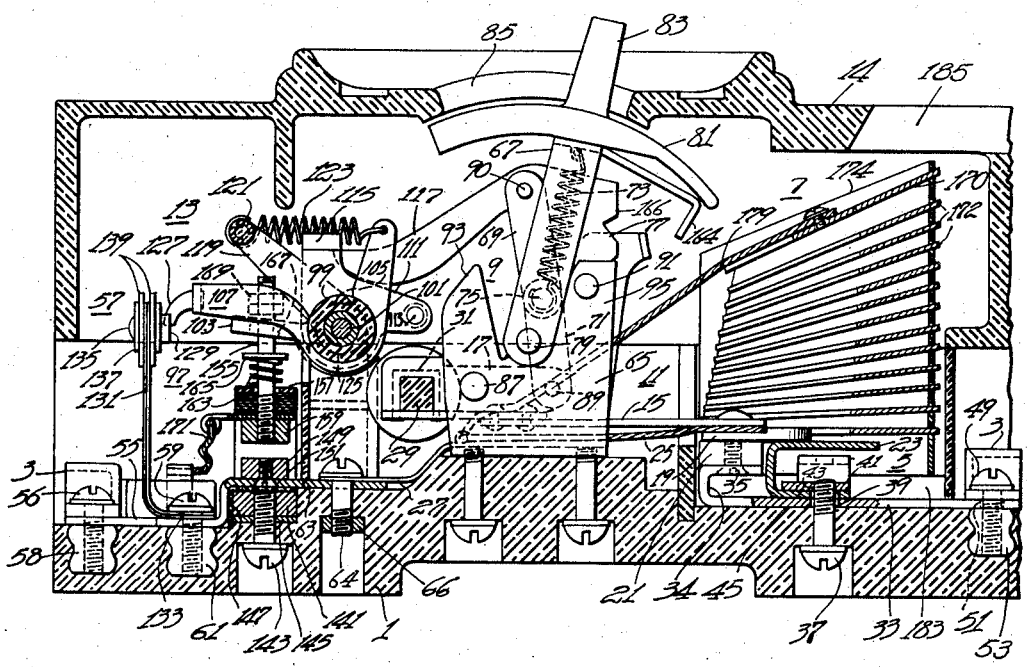

Referring to the drawings, Figure 1 is a plan view of a three-pole circuit breaker embodying the principal elements of my invention, a portion of the cover has been cut away to more clearly illustrate the structural features involved, Fig. 2 is a sectional view of the circuit breaker shown in Fig. 1 on the line II—II of that figure, Fig. 3 is a fragmentary perspective view showing the details of my improved trip device and a portion of the circuit breaker actuating mechanism, Fig. 4 is a plan view of the trip bar utilized in this embodiment of my invention, Fig. 5 is a fragmentary view, partially in section, showing the trip bar of Fig. 4 and one of the trip members, Fig. 6 is a fragmentary, sectional view showing the circuit breaker operating mechanism and the trip device in the tripped position, following the operation of one of the magnetically responsive trip elements, Fig. 7 is a view similar to Fig. 6 showing the circuit breaker operating mechanism and the trip device in the tripped position following the actuation of one of the thermally responsive elements, Fig. 8 is a fragmentary, elevational view showing the details of one of the magnetically responsive trip elements, Fig. 9 is a fragmentary, sectional view taken on the line IX—IX of Fig. 8, Fig. 10 is an exploded, perspective view showing the details of the contact structure used in this embodiment of my invention, Fig. 11 is a plan view of the top plate of one of the arc extinguishing devices, and Fig. 12 is a plan view of one of the arc-extinguishing plates utilized in this embodiment of my invention.

As shown in Figs. 1 and 2, the base 1 of the circuit breaker is of molded insulating material and has mounted thereon six terminal contacts 3—two for each of the three poles of the breaker—three stationary contact assemblages 5, an arc extinguishing device 7 for each of the three poles, the single circuit breaker operating mechanism 9, which has associated therewith the three movable switch members 11, and the trip device 13. A cover 14, which is preferably of molded insulating material, is provided for enclosing and protecting the breaker mechanism. Each of the switch members 11 includes a resilient switch arm 15, preferably of spring steel, which is riveted at one end to the associated switch member frame 17 and which supports a moving contact member 19 at the other end. Each of the moving contact members 19 is adapted to cooperate with one of the main stationary contact members 21 and one of the arcing contacts 23 which are shown particularly in Fig. 10.

A flexible shunt 25 is provided for connecting each of the moving contacts 19 with one of the conducting members 27 which serve to complete the electric circuit from the shunts 25 to the trip device 13. The three switch member frames 17, which are substantially channel shaped, are rigidly connected together by means of an insulating tie bar 29 which extends through suitable openings in the sides of the frames, the tie bar 29 being rigidly fastened to each of the frame members 17 by means of a strap member 31.

Each of the stationary contact assemblages 5, as is shown particularly in Figs. 2 and 10, includes a main support or base strip 33 having a looped portion 34 at one end thereof, and a main stationary contact member 21, which is preferably of a silver graphite composition, affixed to, and supported on, this looped portion 34 by means of a screw 35. Each of the contact assemblages 5 is supported on the base 1 of the circuit breaker by means of a screw 37 which extends through the opening 39 in the base strip 33, and a similar opening 41 in the lower portion of the looped arcing contact 23, and engages a threaded opening 43 in the central portion of one of the U-shaped supports 45 for the arc extinguishers. The looped arrangement of the current paths through the contact assemblages 5 causes the magnetic reactions acting on the arc to bias the arc toward the arc extinguisher 7. The U-shaped supports 45 are preferably constructed of iron and not only serve to position and support the contact assemblages 5 and the arc extinguishers 7 but in addition serve to aid in the arc extinguishing operation by facilitating the movement of one end of the arc toward the end of the looped arcing contact 23. The looped arcing contacts 23 are preferably constructed of nickel, this material having good arc resisting qualities and, in addition, being magnetic, thereby further facilitating the movement of the arc from the main stationary contact 21 toward the associated arc extinguisher 17. One of the terminal contacts 3 is electrically connected to the base strip 33 of each of the stationary contact assemblages 5 by means of a screw 49 which extends through the opening 51 therein to engage a threaded retaining member 53 which is imbedded in the base 1.

Suitable conducting strips 55 are provided for connecting the terminals 3 on the trip mechanism end of the circuit breaker with the trip device 13, three screws 56 which engage threaded retaining members 58 imbedded in the base 1 being utilized for electrically connecting the terminals 3 with the strips 55. Each of the strips 55 is, in turn, electrically connected to one end of one of the U shaped, current-carrying, thermally responsive elements 57, which form a portion of the trip device 13, by means of a similar screw 59 and imbedded retaining member 61. The other end of each of the U shaped bimetallic elements 57 is connected to a third conducting strip 63 by means of a second screw 59 and retaining member 61. The conducting strips 63 are each affixed to the base 1 of the circuit breaker by means of a cap screw 64 and nut 66 which also serve to electrically connect the conducting member 27 thereto.

The electrical circuit for each of the poles is essentially the same; beginning with the terminal contact 3 at the trip mechanism end of the breaker, the current flows successively through the conducting strip 55, the U shaped, thermally responsive element 57, the conducting strip 63, the conducting member 27, the flexible shunt 25, the moving contact member 19, the stationary contact member 21, and thence through the support strip 33 to the other terminal contact 3.

The operating mechanism 9, which is of the quick make and quick break type, is supported on a U shaped frame member 65 and includes a bifurcated operating handle 67, two pivotally joined toggle links 69 and 71 for engaging the interconnected switch members 11, a pair of over-center springs 73 for operatively connecting the handle 67 and the knee pivot pin 75 of the toggle linkage, and a cradle 77 for releasably engaging one end of the toggle linkage so as to provide a means whereby actuation of the trip device 13 can cause the operating mechanism 9 to automatically move all of the switch members 11 to the open circuit position. The bifurcated operating handle 67 is pivotally supported on the U shaped frame 65 by means of two pivot pins 79, one of which engages the end of each of the bifurcated portions. An insulating shield 81 having a projecting portion 83 which extends through an opening 85 in the circuit breaker 14 is provided for permitting manual operation of the circuit breaker.

The interconnected switch members 11 are pivotally supported on the U shaped frame by means of a pin 87 which engages the central switch member frame 17. One end of the lower toggle link 71 is pivoted to the central switch member frame 17 through the agency of a pin 89 (Fig. 2) which provides the only mechanical connection between the operating mechanism 9 and the switch members. The other end of the toggle link 71 is pivotally connected to the lower end of the upper toggle link 69 by means of the knee pivot pin 75. The knee pivot pin 75 extends for some distance on either side of the toggle links, and each of the projecting portions is adapted to be engaged by one end of one of the overcenter operating springs 73, the other end of the operating springs 73 being fastened to the central portion of the bifurcated operating handle 67. The upper end of the toggle link 69 is pivotally fastened (by a pin 90) to the carrier member 77 which, in turn, is pivotally supported on the U shaped frame 65 by means of a pin 91. The limits of motion of the bifurcated operating handle 67 are defined by the offset projections 93 and 95 (shown particularly in Fig. 3).

The trip device 13 includes, as mentioned previously, three U-shaped, current-carrying, thermally responsive elements 57, one of which is connected in series with each of the poles of the breaker, and in addition, includes three magnetically responsive trip elements 97 each of which is operable, upon the occurrence of predetermined conditions, both to actuate the trip device and to limit the current flow in one of the thermally responsive elements 57. Heretofore, considerable difficulty has been experienced in securing a simple, current-carrying, thermally responsive element which was capable of opening the circuit after a predetermined time delay upon the occurrence of moderate overload conditions and which would not be damaged so as to cause a change in its calibration upon the occurrence of heavy overload or short circuit conditions. This difficulty has arisen due to the great difference in magnitude between ordinary overload currents and short circuit currents, and has resulted in a very definite limiting of the minimum amount of current for which a circuit breaker trip device could be operated.

The difficulty is especially aggravated in that short circuit or heavy current arcs have a tendency to persist for an appreciable period of time, and the current-carrying, thermally responsive element is, of course, subjected to the heating effect of the arc current during this period. The one solution which has helped to alleviate the difficulties heretofore encountered has been the provision of a trip device which included a thermally responsive and a magnetically responsive trip element, the magnetically responsive trip element being movable to cause instantaneous operation of the trip device upon the occurrence of severe overload conditions. But even this arrangement has not been entirely satisfactory, since it in no way lessens likelihood of damage to the current-carrying, thermally responsive device during the period of arc extinction. My invention, however, not only secures instantaneous operation of the trip device upon the occurrence of short circuit or heavy overload conditions, but at the same time limits the current flow through the current-carrying thermally responsive element, thus preventing any change in the calibration of that device and assuring reliable operation of the interrupter under all possible operating conditions.

The trip device 13 also includes a pivotally supported trip bar 99 (Figs. 4 and 5) of molded insulating material which has a centrally disposed metallic support member 101 molded therein; the trip bar 99 is provided with three outwardly projecting members 103 formed integral therewith, six annular slots 105 for supporting the three trip members 107, and a means for engaging the circuit breaker operating mechanism. This engaging means includes a pair of substantially parallel plate sections 111 which are rigidly affixed to the trip bar, a pin 113 which connects the two plate sections 111 and provides a means for making possible the resetting of the trip device, and a latch member 115 which is adapted to engage the end 117 of the carrier 77 when the trip device is in the untripped position. The trip bar 99 is pivotally supported on a pair of upstanding bracket members 119, connected at their upper ends by an insulating rod 121. This rod is used as a support for one end of the springs 123 which individually bias each of the trip members 107 to the tripped position.

Each of the trip members 107, as is shown particularly in Figs. 3 and 5, comprises a bifurcated member which is adapted to be supported on the trip bar 99 itself. The two side portions of each of the bifurcated trip members 107 have a substantially semi-circular slot 125 therein, and it is through the agency of these slots 125 in the trip members and the annular slots 105 in the trip bar 99 that the trip elements are supported on the trip bar so as to be individually movable independently of that member. The slots 125 in the trip members and the annular slots 105 in the trip bar 99 are of substantially the same radius, thus the slidable movement of the trip elements is essentially one of rotation about the axis of the trip bar itself. Each of the trip members 107 is biased to the tripped position, as mentioned above, by two of the springs 123 and is retained in the untripped position by one of the thermally responsive elements 57, each of the trip members being provided with a projecting portion 127 for engaging the latch plate 129 affixed to the upper portion of each of the thermally responsive elements 57.

The thermally responsive elements 57 each comprise a U-shaped member of bimetallic material 131, the ends of which are bent over at substantially right angles in order to form a pair of terminal portions 133. One of the latch plates 129 is affixed to the upper end of each of the bimetallic members 131 by means of two rivets 135 which extend through enlarged openings (not shown) in the bimetallic member and serve to mechanically interconnect the latch plate 129 and the metallic retaining plate 137, the latch plate 129 and the retaining plate 137 being insulated from the adjacent portions of the bimetallic element 131 by means of a pair of mica plates 139.

When any one of the thermally responsive elements 57 moves a sufficient distance away from the operating mechanism 9, in response to a predetermined overload condition in the connected circuit, to release the end 127 of the associated trip member 107, that member is then free to move in a counter-clockwise direction (Fig. 6)

about the axis of the trip bar 99 under the biasing action of the springs 123. This movement is subsequently transmitted to the trip bar itself through the engagement of the two side portions of the released trip member with the end of the adjacent projecting member 103 and causes the trip bar 99 to rotate a sufficient distance in a counter-clockwise direction to effect a disengaging of the end 117 of the carrier 77 by the engaging plate 115. This disengaging of the carrier 77 allows that member to rotate in a clockwise direction about its pivot pin 91 under the influence of the overcenter operating springs 73 and, as will be explained in some detail later, causes all of the switch members 11 to move to the open circuit position with a snap action.

Each of the magnetically responsive trip devices 97 includes a U-shaped core member 141 which is affixed to the base 1 by means of a screw 143, and a yoke 145 of non-magnetic material which fits around the core member 141 and is held in position between that member and the base 1 through the force exerted by the screw 143. Each of the conducting strips 63 extends through the central portion of one of the U-shaped core members 141, being insulated therefrom by means of the strip 147 of insulating material, and is provided with a contact member 149 affixed thereto by means of a screw 151. These strips 63, each of which carries the entire current flowing through the associated pole of the breaker, serves as energizing means for the core members 141.

A movable armature 153 is slidably supported on the upper portion of each of the yoke members 145 by means of a pin 155 which extends through a guide opening 157 in the yoke. This armature is provided with a contact member 159 for cooperating with the similar contact member 149 affixed to the adjacent conducting strip 63, and is biased away from the core member 141 by means of a spring 163 which coperates with a washer 165 rigidly affixed to the pin 155. The upper end of each of the pins 155 is threaded and is adapted to extend through one of the openings 167 in the projecting portions 103 of the trip bar 99. A pair of the nuts 169 is provided for mechanically connecting each of the armatures 153 to the trip bar 99.

It will be observed from Fig. 2 that the latch member 115 is so positioned with respect to the pivot axis 101 that the point or points of engagement thereof with the end of the trigger or carrier are located either directly above the pivot axis or slightly to the left of a vertical line passing through the axis; so that the biasing action of the over-center springs alone will hold the latch in operative or latched in position to restrain the trigger or carrier 77. Hence no springs are necessary to bias the latch member 115 to latching position. The resistance to be overcome in moving the latch to releasing position is solely that of the friction between the engaging surfaces of the latch member 115 and the carrier or trigger 77.

The provision of the separate spring biased trip member or members, to engage and move the latch member to releasing position permits the use of a light load latch controlled by the thermally responsive trip elements. The springs 123 are of sufficient strength to cause the trip member to engage, overcome the friction between the latch and the carrier, and move the latch member to its releasing position. It will be noted that the extensions or projecting portions 127 of the trip members are of sufficient length to provide a long lever arm, so that the latches comprising the latch plate 129 and the ends of the projecting portions 127 carry a relatively light portion of the force of the spring 123 as compared to the force exerted thereby on the projection 103 when the trip members are released.

The improved structure of the trip device also allows for a more accurate calibration of the trip characteristics of the circuit breaker by reason of the fact that the amount of overlap of the light load latch comprising the elements 127 and the latch plates 129 can be accurately predetermined to fix the trip characteristics of the circuit breaker without regard to the amount of overlap of the main latch 115 with the carrier 77.

Each of the upper contact members 159, which are supported on the movable armatures 153, is electrically connected, by means of a flexible shunt 171, to the opposite terminal of the adjacent U-shaped bimetallic element 131 to that to which the contact member 149 is connected. Thus, upon the occurrence of a short circuit or predetermined heavy overload condition in any one of the poles of the breaker, the movable armature 153 for that pole is attracted to the cooperating core member 141 against the biasing action of the spring 163, and, in moving to the attracted position, serves to rotate the trip bar 99 to the tripped position and to simultaneously short circuit the two terminals 133 of the connected thermally responsive element 131, thereby limiting the current flow through that element during the arc extinguishing operation. The limiting of the current flow prevents undue heating of the bimetallic elements and is of great value in preserving the calibration of those elements.

The circuit breaker is shown in Fig. 2 in the closed circuit position, the trip device 13 being in the untripped position. To open the contacts manually the operating handle 67 is moved in a counterclockwise direction about its pivot point (the pins 79). This movement brings the line of action of the operating springs 73 to the left of the line connecting the center of the knee pivot pin 75 and the center of the pivot pin 90, which connects the upper toggle link 69 to the carrier 77, and in so doing produces a component of force which biases the knee pivot pin 75 away from the overcenter position toward the collapsed position. Before the operating handle reaches the full on position, this component becomes sufficiently great to set the mechanism in motion, and, since any movement of the knee pivot pin 75 from the closed circuit position toward the open circuit position results in a progressive increase in the component of force exerting that pin toward the open circuit position, the opening operation once started proceeds automatically and with an increasing acceleration, irrespective of the rate of movement of the operating handle 67. The collapse of the toggle mechanism causes the interconnected switch members 11 to rotate about their pivot pin (the pin 87) to the position shown in Figs. 6 and 7.

To close the contacts manually, the operating handle is moved from the open circuit position in a clockwise direction (Fig. 2) toward the closed circuit position. As soon as the line of action of the overcenter springs 73 crosses the center line of the upper toggle link 69, that link is caused to move toward the overcenter or closed circuit position, in which position the toggle holds the contacts in the closed circuit position irrespective of the force exerted by the overcenter operating springs. The closing operation takes place, as does the opening operation, with a snap action.

When the breaker is in the closed circuit position, the carrier 77 is biased in a clockwise direction about its pivot point (the pin 91) by the reaction forces of the springs 73 and is retained in the operative position through the engagement of the end 117 of the carrier with the latching member 115 on the trip bar 99. Upon the occurrence of a moderate overload condition, in the circuit controlled by any one of the poles of the breaker, which is of sufficient magnitude and duration to cause the serially connected thermally responsive element 131 to deflect and release its associated trip member 107, that member moves under the biasing action of the springs 123, to rotate the trip bar 99 to the tripped position (shown in Fig. 7), thereby releasing the carrier 77. The subsequent rotation of the carrier 77 brings the line of action of the overcenter springs 73 to the left of the center line of the upper toggle link 69, and thus causes the toggle to move to the open circuit, collapsed position regardless of the position of the operating handle 67. The breaker is, therefore, entirely trip free.

Upon the occurrence of a large overload or short circuit condition in the circuit controlled by any one of the poles of the breaker, the trip bar 99 is moved from the untripped to the tripped position (shown in Fig. 6) by movement of the armature of the affected magnetically responsive device, which, simultaneously, short circuits the associated current-carrying, thermally responsive element. It should be noted that the tripping operation when carried on by one of the magnetically responsive devices in no way affects the position of the trip members 107, those members being slidably supported on the trip bar 99 through the engagement of the slots 125 with the annular slots 105 in the trip bar itself.

When the circuit breaker is in the tripped position, the operating handle 67 moves to a position midway between the normal open circuit and closed circuit positions, as shown in Figures 6 and 7. The handle is held in this mid position due to the engagement between the downwardly projecting portion 164 of the handle and the portion 166 of the carrier, the handle being biased in a counterclockwise direction by the operating springs 73, and it serves as a convenient indicating means for showing that the circuit has been opened by operation of the trip device.

Following each opening of the circuit as a result of an operation of the trip device 13, it is necessary to restore the operating mechanism 9 and the trip device 13 to an operative condition. This is done by rotating the operating handle 67 in a counterclockwise direction from the position shown in either Fig. 6 or 7 (the tripped position) to the position shown in Fig. 3 (the open circuit position). The counterclockwise movement of the operating handle 67 is transmitted to the carrier 77 through the engagement of the downwardly projecting member 164 with the portion 166 of the carrier. As the carrier is rotated, the end 117 thereof engages the pin 113 which forms a part of the mechanism engaging means and, since that pin is rigidly connected to the trip bar 99 causes the trip bar to rotate in a clockwise direction a sufficient distance to permit the latch member 115 to reengage the end 117 of the carrier 77. This reengagement occurs somewhat before the operating handle 67 reaches its limit of motion in a counterclockwise direction.

The rotation of the trip bar 99 not only effects the reengaging of the operating mechanism 5 and the trip device but, in addition, causes a resetting of both the thermally responsive and the magnetically responsive elements of the trip device. This is accomplished by the engagement of the projecting portions 103 of the trip bar 99 with the side portions of the trip elements 107 and with the pins 155. The positive separation of the contacts 149 and 159 which necessarily accompanies the resetting operation is of great value in increasing the reliability of operation of the device, because it positively assures the restoring of the thermally responsive elements to an operative condition following each operation of any of the current limiting magnetically responsive devices, despite any welding of the contacts which might occur.

The resetting of the trip elements and the reengaging of the operating mechanism by the trip device restore the circuit breaker to an operative condition in the open circuit position. The contacts may then be manually moved to the closed circuit position exactly as described above.

The arc extinguishers 7 which I prefer to use in this embodiment of my invention are of the spaced-plate type, and comprises generally a stack of slotted plates of magnetic material which are insulated from each other and are positioned adjacent the path of movement of the moving contact member. Following the initiation of the arc incident to the separation of the current-carrying contact members, the presence of these plates produces a magnetic reaction which causes the arc to move in a direction toward the end of the slots. This movement results in the breaking up of the arc into a plurality of serially connected short arcs as soon as the single arc reaches the ends of the slots, and shortly thereafter causes the extinguishment of the several small arcs.

As shown particularly in Figures 1, 2, 11 and 12, the arc extinguishers 7 each comprise a top plate 170 and a plurality of slotted plates 172, preferably of iron, all of which are supported and spaced from each other by means of a U-shaped insulating member 174. Each of the plates 172 and the plate 170 have three projecting lugs 176 formed integral therewith; these lugs are adapted to engage suitable openings in the U-shaped insulating member 174 and, in the assembled extinguishers, are swaged over, thus rigidly fastening the entire structure together.

I have found that by providing slotted arc extinguishing plates in which the degree of taper of the slot is less at the inner portion than it is at the outer portion, that the breaking up of the arc into a plurality of serially connected arcs is considerably facilitated. One form of this is shown in Fig. 12, where the inner portion 175 of the slot 173 has a considerably less taper than the outer portion 177. The top plate 170 of each of the arc extinguishers 7 is electrically connected to the flexible shunt 25 forming a part of the associated movable switch arm 11 by means of a conductor 179 in order to facilitate the transfer of the arc from the moving contact 19 to the top plate of the arc extinguisher. Each of the slotted arc extinguishing plates 172 is provided with a number of ventilating openings 181 in the rear portion thereof. These ventilating openings are offset so that by assembling the plates 172 with the openings alternately on one side of the center line and then the other, it is possible to secure an arc extinguishing device which is completely ventilated and which at the same time does not have a through opening therein where the arc might strike.

The U shaped insulating members 174, in combination with the ventilating openings 181, previously discussed, provide a most satisfactory means for preventing flashover between the poles of the breaker during the interruption of heavy current arcs, since a considerable portion of the arc gases from each of the three arcs is retained within the extinguishers 33 and the openings 181. The passages 183 adjacent the conducting strips permit the circulation and cooling of these gases within the extinguishers and ultimately cause them to be vented to the atmosphere through the openings 185 in the cover 14.

The operation of this arc extinguisher is essentially the same as that of other spaced-plate type devices. The arc is established within the aligned slots 173 in the stack of spaced plates and the cooling is accomplished by the sub-division of the arc into a plurality of serially connected small arcs which are moved in the spaces between the plates due to the magnetic reactions caused thereby. The movement of the arc into the extinguisher is facilitated and aided by the improved contact structure as described in a previous paragraph.

It will thus be seen that I have disclosed an improved circuit breaker which is more reliable and accurate in its operation than the previously known devices of this type, and which, at the same time, is simple in structure and is economical to a manufacturer. My improved circuit breaker is trip free of the operating handle under all operating conditions; it is snap acting during both the opening and closing operation; it is provided with an improved arc extinguishing device and an improved contact structure; and, in addition, it includes a novel trip device which is operable to cause the circuit breaker actuating mechanism to move all of the switch members to the open circuit position after a time delay upon the occurrence of overload conditions. Further, the trip device of my invention is operable to cause the interruption of the controlled circuit substantially instantaneously upon the occurrence of a short circuit or overload condition and, at the same time, has means associated therewith for protecting the thermally responsive elements from overload currents of unduly large magnitude.

While in accordance with the patent statutes, I have disclosed the foregoing details of a practical embodiment of my invention, it is to be understood that many of these are merely illustrative and that variations in their precise form will be desirable in some applications. I desire, therefore, that the language of the accompanying claims shall be accorded the broadest reasonable construction and that my invention shall be limited only by what is expressly set forth in the claims and by the prior art.

I claim as my invention:

1. In a circuit interrupter, means for opening and for closing the circuit, means for actuating said means for opening and for closing the circuit, and a trip device including a pivotally supported member for releasably engaging said actuating means, a current-carrying means having a thermally responsive bimetallic member associated therewith, said bimetallic member being movable when heated to cause said pivotally supported member to disengage said actuating means, and magnetically responsive means movable, independently of said current carry means, upon the occurrence of predetermined conditions to cause said pivotally supported member to disengage said actuating means and to limit the current flow in said thermally responsive means, said bimetallic member being movable to cause said pivotally supported member to disengage said actuating means while said magnetically responsive means remains stationary.

2. In a multi-pole trip device for a circuit breaker, a trip bar having a latch portion for normally engaging and restraining from movement an element of the circuit breaker movable to cause opening thereof, said trip bar being movable from a normal untripped to a tripped position to effect the actuation of said device to release said element of the circuit breaker and cause opening thereof, a plurality of trip members mounted from said trip bar and individually movable relative thereto so as to be movable from a normal inoperative to an operative position, each of said trip members when moving from said inoperative to said operative position engaging said trip bar and moving that bar from said untripped to said tripped position, and a plurality of electro-responsive elements, one of which is operable to cause movement of each of said trip members.

3. In a multi-pole trip device, a singe trip bar which is movable from a normal untripped to a tripped position to effect the actuation of said device, a plurality of trip members mounted from said trip bar for individual movement relative thereto so as to be movable from a normal inoperative to an operative position, each of said trip members when moving from said inoperative to said operative position engaging said trip bar and moving that bar from said untripped to said tripped position, a plurality of electro-responsive elements of one type, one of which is operable to cause the movement of each of said trip members, a plurality of electro-responsive elements of a different type operable to cause movement of the same said trip bar, and one of said two types of electro-responsive elements being magnetically responsive to operate quickly upon the occurrence of a large overload and the other being thermally responsive and operable with a time delay upon the occurrence of a small overload.

4. In a multi-pole trip device for a circuit breaker, a single trip bar having a latch portion for normally engaging and restraining from movement an element of the circuit breaker movable to cause opening thereof, said trip bar being movable from a normal untripped to a tripped position to effect the actuation of said device to release said element of the circuit breaker and cause opening thereof, a plurality of trip members mounted from said trip bar and individually movable relative thereto so as to be movable from a normal inoperative to an operative position, each of said trip members when moving from said inoperative to said operative position engaging said trip bar and moving that bar from said untripped to said tripped position, and a plurality of electro-responsive elements of one type, one of which is operable to cause movement of each of said trip members, a plurality of electro-responsive elements of a different type operable to cause movement of the same said trip bar, and one of said two types of electro-responsive elements being magnetically responsive to operate quickly upon the occurrence of a large overload and the other being thermally responsive and operable with a time delay upon the occurrence of a small overload.

5. In a circuit interrupter, means for opening and for closing the circuit, means including an operating handle for actuating said means for opening and for closing the circuit, and a trip device including means for releasably engaging said actuating means, current-carrying, thermally responsive means having at least a portion thereof of thermally responsive material, and magnetically responsive means, said thermally responsive means and said magnetically responsive means each being independently movable while the other remains stationary to cause said engaging means to disengage said actuating means upon the occurrence of predetermined conditions, said actuating means, when disengaged by said engaging means, causing said means for opening and for closing the circuit to move to the open circuit position irrespective of the position of said operating handle, said magnetically responsive means limiting the flow of current through said current-carrying thermally responsive means upon the occurrence of predetermined conditions.

6. In a circuit interrupter, means for opening and for closing the circuit, means for actuating said means for opening and for closing the circuit, and a trip device including means for operatively engaging said actuating means, said actuating means causing said means for opening and for closing the circuit to move to the open circuit position upon the operation of said trip device, a trip member movable from a normal inoperative position to an operative position to operate said trip device, means for moving said trip member from said inoperative position to said operative position with a snap action, a current-carrying, thermally responsive element which normally holds said trip member in said inoperative position, and magnetic means actuable upon the occurrence of predetermined conditions to effect the operation of said trip device without moving said trip member and to limit the flow of current in said current-carrying, thermally responsive element.

7. In a circuit interrupter, means for opening and for closing the circuit, means for actuating said means for opening and for closing the circuit, and a trip device operable upon the occurrence of predetermined conditions to cause said actuating means to move said means for opening and for closing the circuit to the open circuit position, said trip device including means for operatively engaging said actuating means, a trip member movable from a normal untripped to a tripped position to effect the operation of said trip device, spring means biasing said trip member to the tripped position, a current-carrying thermally responsive means for normally restraining said trip member in the untripped position against said biasing means, and a magnetically responsive means operable upon the occurrence of predetermined conditions, to cause the operation of said trip device and to limit the current in said current-carrying thermally responsive means.

8. In a multi-pole circuit interrupter, means for opening and for closing a plurality of poles, means for actuating said means for opening and for closing a plurality of poles, and a trip device including means for operatively engaging said actuating means, a single trip bar movable to effect the operation of said device, a plurality of current-carrying, thermally responsive elements, and a plurality of magnetically responsive elements, said actuating means causing said means for opening and for closing a plurality of poles to move to the open circuit position upon the operation of said trip device, said trip device being operable by any one of said thermally responsive or said magnetically responsive elements, and each of said plurality of magnetically responsive elements being individually operable upon the occurrence of predetermined conditions to limit the current flowing in one of said current-carrying, thermally responsive elements.

9. In a multi-pole circuit interrupter, means for opening and for closing a plurality of poles, means for actuating said means for opening and for closing a plurality of poles, and a trip device including means for releasably engaging said actuating means, a plurality of current-carrying, thermally responsive means each connected in current responsive relationship with one of the poles of said interrupter, each of said thermally responsive means including a member movable, when heated, to cause said releasable engaging means to disengage said actuating means, and a plurality of magnetically responsive means, each movable in response to a predetermined current condition in one of the poles of said interrupter to cause said engaging means to disengage said actuating means and to limit the current flowing through one of said thermally responsive means, said actuating means automatically moving said means for opening and for closing a plurality of poles to the open circuit position when disengaged by said releasable engaging means.

10. In a multi-pole circuit interrupter, means for opening and for closing a plurality of poles, means for actuating said means for opening and for closing a plurality of poles, and a trip device including means for operatively engaging said actuating means, said actuating means automatically moving said means for opening and for closing a plurality of poles to the open circuit position upon the operation of said trip device, a plurality of thermally responsive elements, a plurality of trip members each individually movable from a normal untripped position to a tripped position to cause the operation of said trip device, means biasing each of said trip members to the tripped position, each of said plurality of thermally responsive elements releasably restraining one of said trip members in the untripped position, and a plurality of magnetically responsive elements each individually movable upon the occurrence of predetermined conditions to cause the operation of said trip device.

11. In a multi-pole trip device, a trip bar movable from a normal untripped position to a tripped position, a plurality of trip elements mounted on said bar and individually movable to cause said bar to move from the untripped to the tripped position, spring means biasing each of said elements to the tripped position, a plurality of thermally responsive means, each of which includes a bimetallic member, for restraining one of said trip elements in the untripped position against said spring biasing means, and a plurality of magnetically responsive means, each of which includes a member for engaging said trip bar, each of said magnetically responsive means being individually movable upon the occurrence of predetermined conditions to move said trip bar from the untripped to the tripped position independently of the position of said trip elements mounted thereon.

12. In a multi-pole circuit interrupter, means for opening and for closing a plurality of poles, means for actuating said means for opening and for closing a plurality of poles, and a trip device including means for operatively engaging said actuating means, said actuating means automatically moving said means for opening and for closing a plurality of poles to the open circuit position upon the operation of said trip device, a plurality of thermally responsive elements, a plurality of trip members each individually movable from a normal untripped position to a tripped position to effect the operation of said trip device, means biasing each of said trip members to the tripped position, each of said plurality of thermally responsive elements releasably restraining one of said trip members in the untripped position against said biasing means, and a plurality of magnetically responsive elements each individually movable upon the occurrence of predetermined conditions to effect the operation of said trip device, said trip members being resettable to the untripped position following each circuit interrupting operation resulting from movement thereof by movement of said engaging means.

13. In electrical apparatus, a base member, a core member of magnetic material, means including at least one screw fastening for affixing said core member to said base member, an armature of magnetic material adapted to be attracted to said core member, means biasing said armature away from said core member, and a bracket member for supporting said armature, said bracket member having a portion adapted to be positioned between said core member and said base member and being retained in position by the pressure exerted therebetween by said means for affixing said core member to said base.

14. In electrical apparatus, a current-carrying, thermally responsive means having at least a portion thereof movable to actuate said apparatus, a magnetically responsive means, including a pair of relatively movable contact members which are normally separated, operable upon the occurrence of predetermined conditions to cause said contact members to engage, thereby limiting the current flow in the current carrying portion of said thermally responsive means, and means actuated by movement of a part of said apparatus for causing the positive separation of said contact members following each operation of said magnetically responsive means.

15. In a circuit interrupter, means movable to open and to close the circuit, means including an operating handle for actuating said means movable to open and to close the circuit, and a trip device operable to cause said actuating means to move said means for opening and for closing the circuit to the open circuit position, said trip device including a current-carrying thermally responsive trip element, and a magnetically responsive element including a pair of relatively movable, normally separated contact members, operable upon the occurrence of predetermined conditions to cause said contact members to engage, thereby limiting the current flow in said thermally responsive means, and means whereby the positive separation of said contact members may be effected, following each operation of said magnetically responsive means, by movement of said operating handle.

16. In electrical apparatus, a looped current carrying member of bimetallic material, the closed end of said looped member being movable when heated to actuate said apparatus, a base, means for supporting the open end of said looped member thereon, and magnetic means for limiting the current flow through said looped member upon the occurrence of predetermined electrical conditions, said magnetic means including a core member of magnetic material, screw fastening means for affixing said core member to said base in operative relation to said current carrying member, an armature of magnetic material adapted to be attracted to said core member to effect the desired limiting of the current flow through said current carrying member, means biasing said armature away from said core member, and a bracket member for supporting said armature adjacent said core member, said bracket member having a portion which is adapted to be positioned between said core member and said base in order that said bracket member may be held in position by the force exerted between said core member and said base by said means for affixing said core member to said base.

17. In a circuit interrupter, separable contacts for opening and for closing the electrical circuit therethrough, actuating means for said contacts, and a trip device operable upon the occurrence of predetermined conditions to cause said actuating means to move said contacts from the closed circuit to the open circuit position, said trip device including means for operatively engaging said actuating means, a pivotally supported trip bar movable from a normal inoperative to an operative position to effect the operation of said trip device, a trip member movable from a normal untripped to a tripped position to effect the rotation of said trip bar to said operative position, means biasing said trip member to the tripped position, a current-carrying thermally-responsive means including a member of bimetallic material for normally restraining said trip member in the untripped position against the force of said biasing means, and a magnetically responsive means operable upon the occurrence of predetermined conditions to cause said trip bar to rotate to the operative position independently of the position of said trip member and to simultaneously limit the current flowing through said current-carrying thermally-responsive means.

18. In a circuit interrupter, separable contacts for opening and for closing the electrical circuit therethrough, actuating means for said contacts, and a trip device operable upon the occurrence of predetermined conditions to cause said actuating means to move said contacts from the closed circuit to the open circuit position, said trip device including means for operatively engaging said actuating means, a pivotally supported trip bar movable from a normal inoperative position to an operative position to effect the operation of said trip device, a trip member supported on said trip bar and movable from a normal untripped to a tripped position to cause said trip bar to rotate from said inoperative to said operative position, means for moving said trip member from said untripped to said tripped position with a snap action, a current-carrying thermally-responsive means which normally restrains said trip member in the untripped position, and magnetic means operable upon the occurrence of predetermined conditions to cause said trip bar to rotate from the inoperative to the operative position and to limit the flow of current through said current-carrying thermally-responsive element, said trip member being supported upon said trip bar through a means which permits said trip bar to be moved to the operative position by said magnetic means without moving said trip member.

19. In a circuit interrupter, separable contacts for opening and for closing the electrical circuit therethrough, actuating means for said contacts, and a trip device operable upon the occurrence of predetermined conditions to cause said actuating means to move said contacts from the closed circuit to the open circuit position, said trip device including means for operatively engaging said actuating means, a pivotally supported trip bar which is formed at least partially of insulating material and which is rotatable from a normal inoperative position to an operative position to effect the operation of said trip device, a trip member supported upon said trip bar and movable from a normal untripped to a tripped position to effect the rotation of said trip bar from said inoperative to said operative position, spring means biasing said trip member to the tripped position, a current-carrying thermally-responsive means including a member of bimetallic material for normally restraining said trip member in the untripped position against the force of said spring biasing means, and a magnetically responsive means operable upon the occurrence of predetermined conditions to cause said trip bar to rotate from said inoperative to said operative position and to limit the magnitude of the current flow through said current-carrying thermally responsive means, said trip member being supported on said trip bar through a lost motion connection which permits said trip bar to be moved to the operative position by said magnetic means without moving said trip member.

20. In a multi-pole circuit interrupter, means for opening and for closing a plurality of poles, actuating means for said means for opening and for closing a plurality of poles, and a trip device operable upon the occurrence of predetermined conditions to cause said actuating means to move said means for opening and for closing said plurality of poles from the closed circuit to the open circuit position, said trip device including a pivotally supported trip bar movable from a normal inoperative position to an operative position to effect the operation of said trip device, a plurality of trip elements mounted on said bar and individually movable from a normal untripped to a tripped position to cause said bar to rotate from the untripped to the tripped position, means for moving each of said trip elements from the untripped to the tripped position with a snap action, a plurality of current-carrying thermally-responsive means each of which releasably restrains one of said trip members in the untripped position, and a plurality of magnetically responsive means each of which includes a member for engaging said trip bar, each of said magnetically responsive means being individually operable to move said trip bar from the inoperative to the operative position without moving said trip elements mounted thereon.

21. In a multi-pole circuit interrupter, means for opening and for closing a plurality of poles, actuating means for said means for opening and for closing a plurality of poles, and a trip device operable upon the occurrence of predetermined conditions to cause said actuating means to move said means for opening and for closing a plurality of poles from the closed circuit to the opened circuit position, said trip device including means for operatively engaging said actuating means, a rotatable trip bar movable from a normal inoperative to an operative position to effect the operation of said trip device, a plurality of trip members each individually movable from the normal untripped position to the tripped position to cause the rotation of said trip bar from said inoperative to said operative position, spring means biasing each of said trip members to the tripped position, a plurality of current-carrying thermally-responsive elements each of which releasably restrains one of said trip members in the untripped position against the biasing force of said spring means, and a plurality of magnetically responsive elements, each of which includes means movable to cause the rotation of said trip bar from said inoperative to said operative position without moving said trip elements, and each of said magnetically responsive elements also including means operable simultaneously with said means for moving said trip bar to short circuit one of said current-carrying thermally responsive elements with a low resistance conductor.

22. In a circuit interrupter, separable contacts for opening and for closing the electrical circuit therethrough, actuating means for said contacts, and a trip device operable upon the occurrence of predetermined conditions to cause said actuating means to move said contacts from the closed circuit to the open circuit position, said trip device including means for operatively engaging said actuating mechanism, a current-carrying thermally-responsive means actuable to effect the operation of said trip device, and a magnetically responsive means likewise actuable to effect the operation of said trip device, said magnetically responsive means including at least one pair of contacts and conducting means associated therewith for short circuiting said current-carrying thermally-responsive element during each operation of said magnetically responsive means, and said actuating means including an operating member movable to effect the opening and the closing of said interrupter and means operable in response to the movement of said operating member following each operation of said magnetically responsive means to effect a positive disengagement of said short circuiting contacts associated with said magnetically responsive means.

23. In a circuit interrupter, separable contacts for opening and for closing the electrical circuit therethrough, actuating means for said contacts, and a trip device operable upon the occurrence of predetermined conditions to cause said actuating means to move said contacts from the closed circuit to the open circuit position, said trip device including a trip bar rotatable from a normal inoperative position to an operative position to effect the operation of said trip device, a current-carrying bimetallic element movable to rotate said trip bar to said operative position, and a magnetically responsive means likewise operable to move said trip bar to said operative position, said magnetically responsive means including at least one pair of separable contacts and conducting means associated therewith for short-circuiting said current-carrying bimetallic element during each operation of said magnetically responsive means, said actuating means including an operating member movable to effect the operation of said interrupter and means operable in response to the movement of said operating member to effect the resetting of said trip device and said actuating means following each opening operation of said interrupter resulting from the operation of said trip device, said resetting means including means for effecting a positive separation of said short-circuiting contacts associated with said magnetically responsive means.

24. In a circuit interrupter, separable main contacts for opening and for closing the electrical circuit therethrough, means for actuating said main contacts, and a trip device operable upon the occurrence of predetermined conditions to cause said actuating means to move said main contact means automatically to the open circuit position, said trip device comprising a current carrying, thermally responsive means having at least a portion thereof movable to effect the operation of said trip device, and a magnetically responsive means which includes a pair of relatively movable, normally separated auxiliary contact members and which is operable upon the occurrence of predetermined conditions to cause said auxiliary contact members to engage, thereby limiting the current flow in said current carrying, thermally responsive means, said actuating mechanism for the main contacts having a part movable to positively separate said auxiliary contact members following each operation of said magnetically responsive means.

25. In a circuit interrupter, separable contacts for opening and for closing the electrical circuit therethrough, means for actuating said contact means, and a trip device operable upon the occurrence of predetermined conditions to cause said actuating means to move said contacts automatically to the open circuit position, said trip device comprising a trip bar movable from a normal inoperative position to an operative position to effect the operation of said trip device, a current carrying, thermally responsive means having at least a portion thereof movable to effect movement of said trip bar from said inoperative to said operative position, and a magnetically responsive means which includes a pair of relatively movable, normally separated contact members and which is operable upon the occurrence of predetermined conditions to cause said contact members to engage, thereby limiting the current flow in said current-carrying thermally responsive means, and to effect movement of said trip bar from said inoperative to said operative position, said trip device and said actuating mechanism being so arranged that said contact members forming a part of said magnetically responsive means are positively separated following each operation of said magnetically responsive means.

26. In a circuit interrupter, separable contacts for opening and for closing the electrical circuit therethrough, means for actuating said contacts, and a trip device operable upon the occurrence of predetermined conditions to cause said actuating means to move said contact means automaticallly to the open circuit position, said trip device comprising a current carrying, thermally responsive means having at least a portion thereof movable to effect the operation of said trip device, and magnetically responsive means which includes a pair of relatively movable normally separated, contact members and which is operable upon the occurrence of other predetermined conditions to cause said contact members to engage thereby limiting the current flow in said current carrying, thermally responsive means, said actuating means including an operating member movable between two extreme positions to effect the operation of said interrupter, said actuating means and said trip device being resettable in response to movement of said operating handle following each opening operation of said interrupter resulting from the operation of said trip device, and said trip device including means actuable to effect a positive disengagement of said contacts forming a part of said magnetically responsive means during each resetting operation.

27. In a multi-pole trip device, a trip bar which is movable from a normal untripped to a tripped position to effect the actuation of said device, a plurality of trip members mounted on said trip bar for movement relative thereto so as to be movable from a normal inoperative to an operative position, each of said trip members when moving from said inoperative to said operative position engaging said trip bar and moving that bar from said untripped to said tripped position, and a plurality of electro-responsive elements, one of which is operable to cause movement of each of said trip members.

28. In a multi-pole trip device, a trip bar, formed of molded insulating material, which is movable from a normal untripped position to a tripped position to effect the actuation of said device, a plurality of trip members mounted on said trip bar for movement relative thereto so as to be movable from a normal inoperative to an operative position, each of said trip members when moving from said inoperative to said operative position engaging a suitable projection molded integrally with said trip bar and moving that bar from said untripped to said tripped position, and a plurality of electro-responsive elements, one of which controls the movement of each of said trip members.

29. In a multi-pole trip device, a trip bar which is movable from a normal untripped position to a tripped position to effect the actuation of said device, a plurality of trip members mounted on said trip bar for movement relative thereto so as to be movable from a normal inoperative to an operative position, each of said trip members when moving from said inoperative to said operative position engaging a suitable projection forming a part of said trip bar and moving that bar from said untripped to said tripped position, means biasing each of said trip elements to said tripped position, and a plurality of electro-responsive elements, each of which normally restrains one of said trip elements in said inoperative position and each of which is actuable upon the occurrence of predetermined conditions to release said element and permit it to be moved to said operative position by the biasing means therefor.

30. In a multi-pole trip device, a rotatable trip bar which is movable from a normal untripped position to a tripped position to effect the actuation of said device, a plurality of trip members mounted on said trip bar for movement relative thereto so as to be individually movable, independently of each other, from a normal inoperative to an operative position, each of said trip members when moving from said inoperative to said operative position engaging said trip bar and moving that bar from said untripped to said tripped position, means biasing each of said trip members to said tripped position, and a plurality of electro-responsive elements, each of which is energized in response to the current flowing in one of the poles of said device and each of which normally restrains one of said trip members in said inoperative position against the force of said biasing means, each of said electro-responsive elements being actuable upon the occurrence of predetermined conditions to release the associated trip member and permit that member to be moved to said operative position by the biasing means therefor.

31. In a multi-pole trip device, a trip bar which is supported for rotative movement from a normal untripped position to a tripped position to effect the actuation of said device, a plurality of trip members mounted on said trip bar, at spaced intervals, for rotative movement relative to said bar substantially about the axis of rotation of said trip bar, said trip members being individually movable, independently of each other, from a normal inoperative to an operative position, each of said trip members when moving from said inoperative to said operative position engaging a suitable projection forming a part of said trip bar and moving that bar from said untripped to said tripped position, means biasing each of said trip members to said tripped position, and a plurality of electro-responsive means, each of which is energized in accordance with the electrical conditions in the circuit of one of the poles of said device and each of which normally restrains one of said trip members in said inoperative position, each of said electro-responsive elements being actuable upon the occurrence of predetermined conditions to release the associated trip member and permit that member to be moved to said operative position by the biasing means therefor.

32. In a multi-pole trip device, a trip bar supported for rotative movement from a normal untripped position to a tripped position to effect the actuation of said device, a plurality of trip members mounted on said trip bar through the agency of cooperating tongue and groove guide portions which serve to support each of said members for rotative movement substantially about the axis of rotation of said trip bar, each of said trip members being movable from a normal inoperative to an operative position and when moving from said inoperative to said operative position engaging said trip bar and moving that bar from said untripped to said tripped position, and a plurality of electro-responsive elements, each of which controls the movement of one of said trip members.

33. In an electro-responsive trip device, a trip bar which is movable from a normal untripped position to a tripped position to effect the actuation of said device, a trip member mounted on said bar so as to be movable from a normal inoperative to an operative position, said trip member when moving from said inoperative to said operative position engaging said trip bar and moving that bar from said untripped to said tripped position, an electro-responsive element which controls the movement of said trip member, and means, other than said electro-responsive element and its associated trip member, for moving said trip bar from said inoperative to said operative position, said last-mentioned means effecting movement of said trip bar without moving said trip member.

34. In electrical apparatus, a current carrying thermal member for causing actuation of said apparatus, a pair of relatively movable contacts connected with the circuit of said thermal member and having means biasing them toward one position, current responsive means for moving one of said contacts against its bias to limit the current flow through said thermal member, and means actuated by movement of a part of said apparatus for causing positive movement of said contacts to the position to which they are biased even though said biasing means is incapable of causing such movement.

35. In a circuit interrupter, relatively movable contacts for opening and closing the circuit, an operating member for actuating one of said contacts, a trip mechanism including an element traversed and heated by the current for causing one of said contacts to move to open position, means actuated magnetically upon the flow of an excess current, a pair of auxiliary contacts operated by said magnetic means to limit the flow of current through said element heated by the current, and means actuated by movement of said operating member for separating said auxiliary contacts.

OLIVER S. JENNINGS.